United States Patent [19]

Bentele et al.

[11] Patent Number: 4,576,489

[45] Date of Patent: Mar. 18, 1986

[54] SYSTEM FOR THE CONTINUOUS LUBRICATION OF A ROLLING BEARING

[75] Inventors: Benedikt Bentele, Hohenroth; Manfred Heerlein, Bad Neustadt, both of Fed. Rep. of Germany

[73] Assignee: Siemens Aktiengesellschaft, Munich and Berlin, Fed. Rep. of Germany

[21] Appl. No.: 621,643

[22] Filed: Jun. 18, 1984

[30] Foreign Application Priority Data

Jul. 4, 1983 [DE] Fed. Rep. of Germany ....... 3324075

[51] Int. Cl.⁴ ............................................. F16C 33/66
[52] U.S. Cl. .................................................... 384/469
[58] Field of Search ............... 384/469, 473, 402, 408, 384/379

[56] References Cited

U.S. PATENT DOCUMENTS 2,284,446 12/1940 Powers .
3,804,476 4/1974 Nakamura et al. ................ 384/469
4,286,829 9/1981 Heemskerk ......................... 384/469
4,340,262 7/1983 Rugh et al. ......................... 384/473

Primary Examiner—Lenard A. Footland
Attorney, Agent, or Firm—F. W. Powers; J. L. James

[57] ABSTRACT

The invention relates to a system for the continuous lubrication of a rolling bearing. The rolling bearing is arranged in a bearing bore provided at a bearing bracket. The lubrication system comprises a reservoir containing a supply of lubricating oil, from which at least one wick leads to the bearing, the lubricating oil being suppliable to the bearing by the wick. To obtain as long as possible a continued lubrication period with as small as possible a supply of lubricating oil, one or more oilproof cavities are provided as lubricating oil reservoir in a separate bearing cover attachable to the bearing bracket. Such a bearing cover can be postfitted in machines to increase the period of continued lubrication.

2 Claims, 1 Drawing Figure

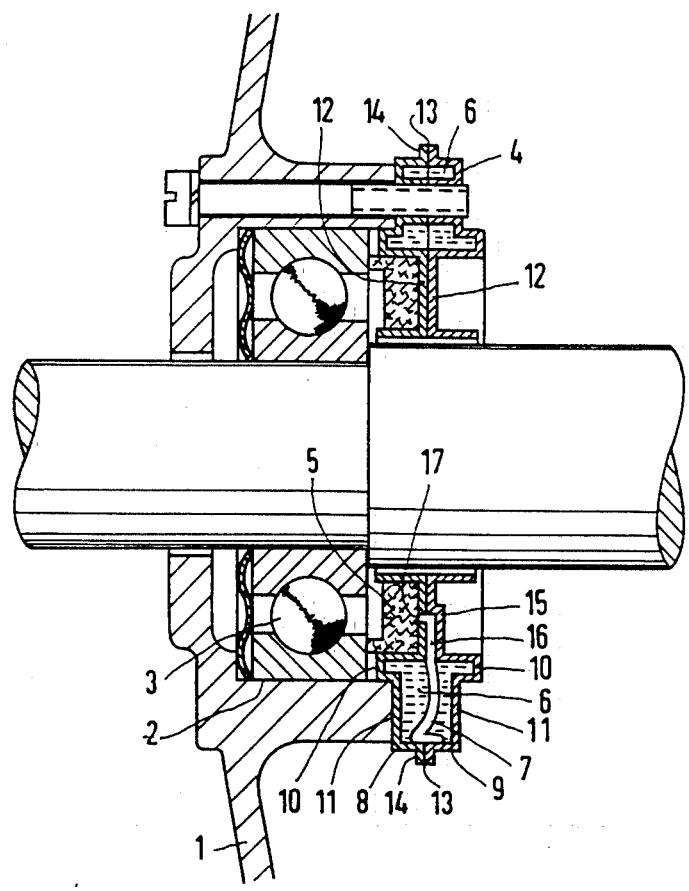

SYSTEM FOR THE CONTINUOUS LUBRICATION OF A ROLLING BEARING

BACKGROUND OF THE INVENTION

The invention relates to a system for the continuous lubrication of a rolling bearing which is disposed in a bearing bore provided at a bearing bracket, in a system including a reservoir containing a supply of lubricating oil and at least one wick leading from this reservoir to the bearing so the lubricating oil is fed to the bearing through the wick. (A typical system is disclosed in U.S. Pat. No. 2,284,446.)

For storing the lubricating oil several pockets are provided in the bearing bracket. These pockets are filled with oil-impregnating fibrous material. From these pockets a wick leads to the rolling bearing so that oil can be conveyed to the bearing through the wick. A disadvantage in this system is that the bearing bracket must be provided with the prockets during its manufacture. Furthermore, a part of the oil is retained by the fibrous material, so that the oil in this material cannot be fed to the bearing completely. Thereby the period of continued lubrication is limited accordingly, or it is necessary to provide a reservoir of appropriate size to obtain a certain period of continued lubrication. There are, however, limits to this set by the dimensions of the bearing bracket.

SUMMARY OF THE INVENTION

It is one object of the invention to provide a system for the continuous lubrication of a rolling bearing in such a way that it can be postfitted in a rolling bearing to be lubricated, without any special structural measures, and with which very long continued lubrication times are obtainable even with a lubricating oil reservoir of relatively small volume.

This object is accomplished in that one or more oil-proof cavities are formed in a separate bearing cover attachable to the bear bracket and covering the bearing bore, in which the cavities are filled with oil. Such a bearing cover is easy to apply on the bearing bracket at any time in place of a corresponding bearing cover without a lubricating oil reservoir. As the cavities of the bearing cover are tightly closed, the oil can be filled in without carrier material. Hence the oil filled into the cavities is fed to the rolling bearing entirely via the wick. Therefore a very long continued lubrication period can be obtained despite a lubricating oil reservoir of relatively small volume.

In the case of a postfitted continuous lubrication system, the oil transport from the bearing cover to the rolling bearing can easily be assured by providing between the bearing cover and the rolling bearing a felt ring in contact with the bearing and communicating with the wick. By such a felt ring any space between the bearing cover and the rolling bearing can be bridged.

Because the bearing cover consists of two interconnectable halves with depressions extending axially and in circumferential directions which are opposite each other after the two halves are fitted together, there results a relatively simple manufacture of such a bearing cover with cavities. The two halves may be deep-drawn parts which are joined together. The two halves may be identical, so that a single tool is needed for the production of the two halves.

A compact assembly unit of the system results due to the fact that there are provided at the two cover halves wall portions extending radially inward from the radially external depressions and forming a contact surface for the two halves, between which wall portions a channel is formed by appropriate embossments extending radially, the wick being placed in the channel and passed through a bore at the radially inner end of the channel to the felt ring disposed at the wall portion of the half turned toward the rolling bearing. In this embodiment of the invention all components needed for the lubrication system are accommodated at or in the bearing cover and a separate assembly operation for the lubrication system is not required.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWING

The single FIGURE shows a preferred embodiment of the invention.

DETAILED DESCRIPTION

Referring to the single FIGURE a bearing bracket 1 is shown in which rolling bearing 3 is arranged in bore 2. Bore 2 is closed by cover 4 on which is fastened felt ring 5. The bearing cover 4 has cavities 6 which are filled with lubricating oil 7. The bearing cover 4 consists of two halves 8 and 9. At their radial outer circumference the two cover halves have depressions 10 and 11 which extend in axial as well as in circumferential directions. After the fitting together of the two cover halves 8 and 9, cavity 6 is formed by these depressions 10 and 11. The two halves 8 and 9 also have wall portions 12 which extend from depressions 10 radially inward, and which form in divisional plane 13 of bearing cover 4 contact areas of the two cover halves 8 and 9. The two cover halves 8 and 9 are joined together in an oilproof manner in both the zone of wall portions 12 and at a peripheral edge 14 projecting radially outward. The oil is filled into cavities 6 through a small opening (not shown). After the filling, this opening is closed in an oilproof manner by means of a plug or by welding.

At one cover half 9 an embossment 15 is provided, which extends in radial direction and by which, in the assembled state of the two cover halves 8 and 9, a channel for a wick 16 is formed. At the radially inner end of this channel, in the other cover half 8 an opening 17 is provided, through which wick 16 is passed to felt ring 5. Instead of single embossment 15 at one cover half, such an embossment may be provided at each cover half, in which case these embossments have half the depth as compared with embossment 15 on one cover half. If embossments are provided at both cover halves, the two cover halves are identical and for their manufacture only a single tool is needed. Instead of one embossment, several embossments may be distributed over the circumference of each cover half and therefore several wicks 16 may be installed.

The quantity of oil fed to felt ring 5 can, in turn, be regulated by matching the cross-section of the channel formed by embossments 15 with the wick cross-section. Likewise, regulation is possible by appropriate selection with respect to the constitution of wick 16.

Since felt ring 5 is disposed on bearing cover 4, all components of the lubrication system are combined in the bearing cover. Hence installation of bearing cover 4 is simultaneous with the installation of the lubrication system at bearing bracket 1. Moreover, the lubrication system fulfills its function in any desired installed position and therefore it is universally usuable.

There has thus been shown and described a novel system for the continuous lubrication of a roller bearing which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In a system for the continuous lubrication of a rolling bearing arranged in a bearing bore provided at a bearing bracket, which comprises a reservoir containing a supply of lubricating oil and at least one wick leading from this reservoir containing a supply of lubricating oil being suppliable to the bearing through said wick, the improvement wherein:

at least one oilproof cavity filled with oil is formed in a separate bearing cover attachable on the bearing bracket and covering the bearing bore;

a felt ring is located between the bearing cover and the rolling bearing, contacting the rolling bearing and communicating with the wick; and said bearing cover further comprises two interconnectable cover halves having depressions extending in axial and circumferential directions, said depressions being opposite each other after the two halves have been fitted together.

2. The system according to claim 1, wherein on the two cover halves wall portions are provided, extending from the radially external depressions radially inward and forming a contact area for the two halves, a channel being formed between said wall portions by corresponding, radially extending embossments, the wick being placed into said channel and passed through a bore provided at the radially inner end of the channel to the felt ring disposed at the wall portion of the cover half turned toward the rolling bearing.

* * * * *